United States Patent [19]
Halford

[11] Patent Number: 6,082,299
[45] Date of Patent: Jul. 4, 2000

[54] AUTOMATIC FISH FEEDER

[76] Inventor: Anthony Christopher Halford, 12B Connaught Avenue Chingford, London, England E4 7AA, United Kingdom

[21] Appl. No.: 09/292,578

[22] Filed: Apr. 15, 1999

[51] Int. Cl.[7] .................................................. A01K 5/02
[52] U.S. Cl. ...................................... 119/51.04; 119/51.11
[58] Field of Search ............................ 119/51.04, 51.11, 119/57.1, 215

[56] References Cited

U.S. PATENT DOCUMENTS

| | | | |
|---|---|---|---|
| 3,920,224 | 11/1975 | Fassauer ................................ | 119/51.11 |
| 3,962,997 | 6/1976 | Ruth ...................................... | 119/51.11 |
| 4,422,409 | 12/1983 | Walker et al. ........................ | 119/51.11 |
| 4,665,862 | 5/1987 | Pitchford, Jr. ........................ | 119/51.11 |
| 5,150,666 | 9/1992 | Momont et al. ...................... | 119/51.04 |
| 5,799,608 | 9/1998 | Beck ...................................... | 119/51.04 |
| 5,873,326 | 2/1999 | Davet et al. ........................... | 119/51.04 |

*Primary Examiner*—Peter M. Poon
*Assistant Examiner*—Elizabeth Shaw

[57] ABSTRACT

A automatic fish feeder for positioning adjacent a fish pond for distributing fish feed into the pond at predetermined time intervals. The automatic fish feeder includes a feed hopper with a bottom opening and a feed auger rotatably mounted in the feed hopper. A motor is provided for rotating the feed auger to move feed in the hopper towards the bottom opening. A switch is electrically connect to the motor. The switch has a timer for controlling activation and deactivation of the motor with switch after first and second predetermined amounts of time respectively.

6 Claims, 2 Drawing Sheets

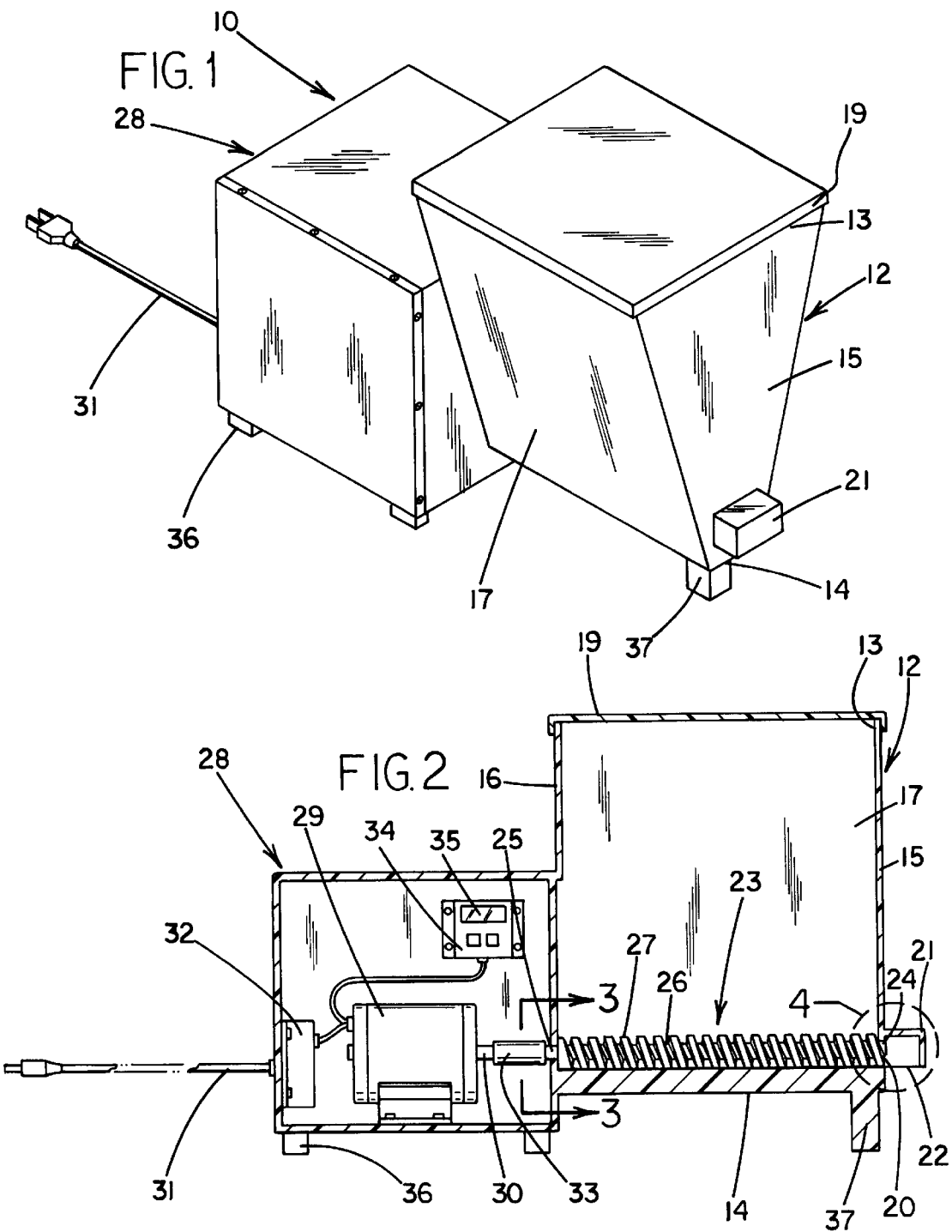

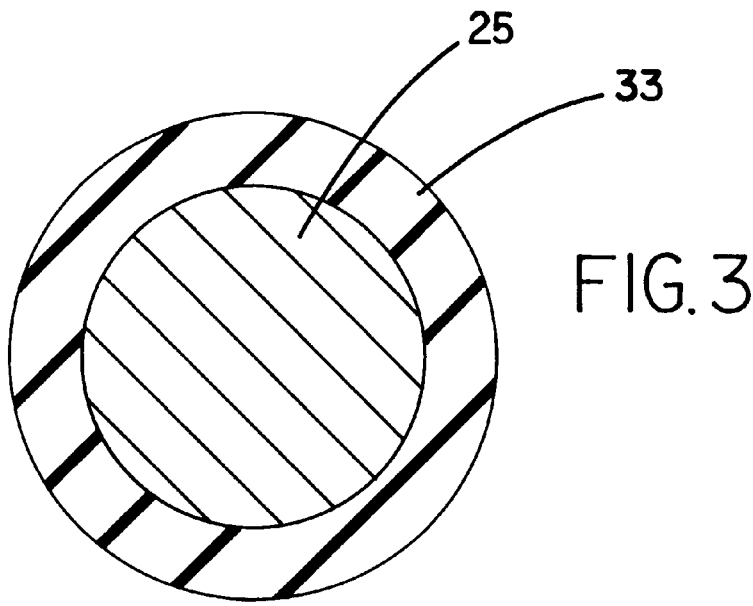
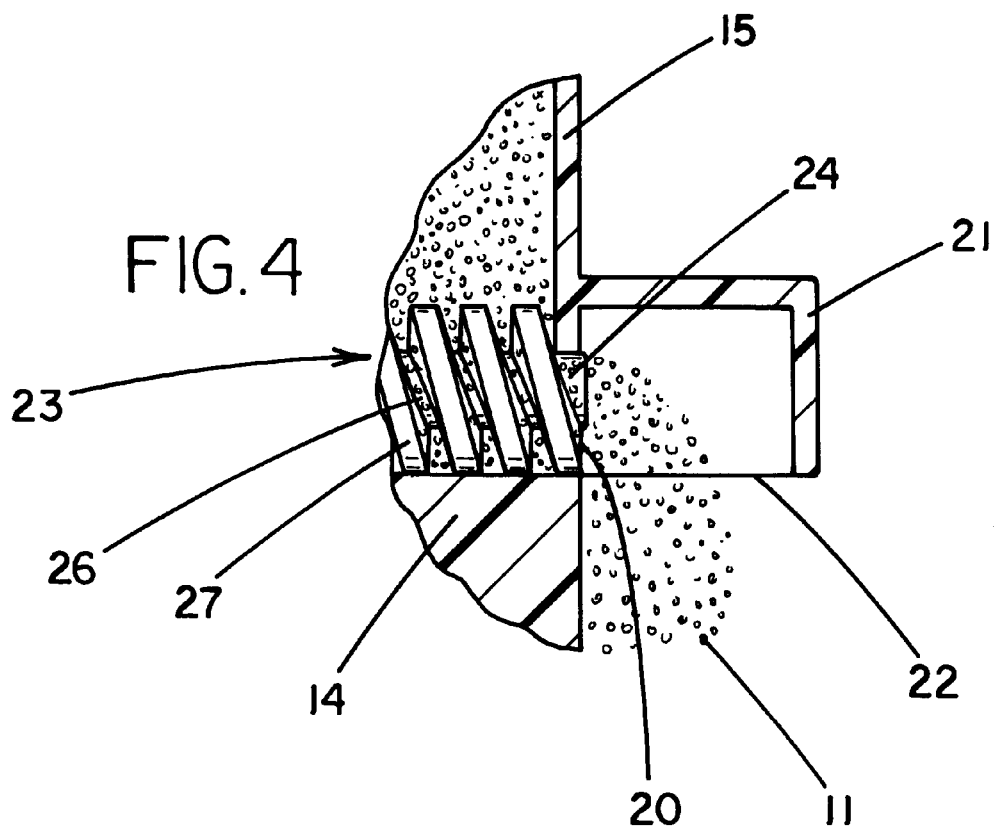

AUTOMATIC FISH FEEDER

BACKGROUND OF THE INVENTION

1. Field of the Invention

The present invention relates to automatic fish feeders and more particularly pertains to a new automatic fish feeder for positioning adjacent a fish pond for distributing fish feed into the pond at predetermined time intervals.

2. Description of the Prior Art

The use of automatic fish feeders is known in the prior art. More specifically, automatic fish feeders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,984,536; U.S. Pat. No. 5,076,215; U.S. Pat. No. 2,243,986; U.S. Pat. No. 3,528,588; U.S. Pat. No. 4,628,864; and U.S. Pat. No. Des. 383,251.

While these devices fulfill their respective, particular objectives and requirements, the aforementioned patents do not disclose a new automatic fish feeder. The inventive device includes a feed hopper with a bottom opening and a feed auger rotatably mounted in the feed hopper. A motor is provided for rotating the feed auger to move feed in the hopper towards the bottom opening. A switch is electrically connect to the motor. The switch has a timer for controlling activation and deactivation of the motor with switch after first and second predetermined amounts of time respectively.

In these respects, the automatic fish feeder according to the present invention substantially departs from the conventional concepts and designs of the prior art, and in so doing provides an apparatus primarily developed for the purpose of positioning adjacent a fish pond for distributing fish feed into the pond at predetermined time intervals.

SUMMARY OF THE INVENTION

In view of the foregoing disadvantages inherent in the known types of automatic fish feeders now present in the prior art, the present invention provides a new automatic fish feeder construction wherein the same can be utilized for positioning adjacent a fish pond for distributing fish feed into the pond at predetermined time intervals.

The general purpose of the present invention, which will be described subsequently in greater detail, is to provide a new automatic fish feeder apparatus and method which has many of the advantages of the automatic fish feeders mentioned heretofore and any novel features that result in a new automatic fish feeder which is not anticipated, rendered obvious, suggested, or even implied by any of the prior art automatic fish feeders, either alone or in any combination thereof.

To attain this, the present invention generally comprises a feed hopper with a bottom opening and a feed auger rotatably mounted in the feed hopper. A motor is provided for rotating the feed auger to move feed in the hopper towards the bottom opening. A switch is electrically connect to the motor. The switch has a timer for controlling activation and deactivation of the motor with switch after first and second predetermined amounts of time respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automatic fish feeder apparatus and method which has many of the advantages of the automatic fish feeders mentioned heretofore and many novel features that result in a new automatic fish feeder which is not anticipated, rendered obvious, suggested, or even implied by any of the prior art automatic fish feeders, either alone or in any combination thereof.

It is another object of the present invention to provide a new automatic fish feeder which may be easily and efficiently manufactured and marketed.

It is a further object of the present invention to provide a new automatic fish feeder which is of a durable and reliable construction.

An even further object of the present invention is to provide a new automatic fish feeder which is susceptible of a low cost of manufacture with regard to both materials and labor, and which accordingly is then susceptible of low prices of sale to the consuming public, thereby making such automatic fish feeder economically available to the buying public.

Still yet another object of the present invention is to provide a new automatic fish feeder which provides in the apparatuses and methods of the prior art some of the advantages thereof, while simultaneously overcoming some of the disadvantages normally associated therewith.

Still another object of the present invention is to provide a new automatic fish feeder for positioning adjacent a fish pond for distributing fish feed into the pond at predetermined time intervals.

Yet another object of the present invention is to provide a new automatic fish feeder which includes a feed hopper with a bottom opening and a feed auger rotatably mounted in the feed hopper. A motor is provided for rotating the feed auger to move feed in the hopper towards the bottom opening. A switch is electrically connect to the motor. The switch has a timer for controlling activation and deactivation of the motor with switch after first and second predetermined amounts of time respectively.

Still yet another object of the present invention is to provide a new automatic fish feeder that provides a hassle-free means for feeding fish in a fish pond without requiring a user to be present to feed the fish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic top perspective view of the exterior of a new automatic fish feeder according to the present invention.

FIG. 2 is a schematic cross sectional view of the present invention.

FIG. 3 is a schematic cross sectional view taken from line 3—3 of FIG. 2 of the region adjacent the second end of the feed auger.

FIG. 4 is a schematic enlarged view of the region around the bottom opening taken from the circular 4 of FIG. 2.

DESCRIPTION OF THE PREFERRED EMBODIMENT

With reference now to the drawings, and in particular to FIGS. 1 through 4 thereof, a new automatic fish feeder embodying the principles and concepts of the present invention and generally designated by the reference numeral 10 will be described.

As best illustrated in FIGS. 1 through 4, the automatic fish feeder 10 generally comprises a feed hopper with a bottom opening and a feed auger rotatably mounted in the feed hopper. A motor is provided for rotating the feed auger to move feed in the hopper towards the bottom opening. A switch is electrically connect to the motor. The switch has a timer for controlling activation and deactivation of the motor with switch after first and second predetermined amounts of time respectively.

In use, the fish feeder 10 is designed for positioning adjacent a body of water for distributing fish feed 11 into the body of water at predetermined time intervals. In closer detail, the fish feeder 10 comprises a feed hopper 12 designed for holding particular fish feed and having a top 13, a bottom 14, a pair of ends 15,16, and a pair of sides 17,18 extending between the ends of the feed hopper. In a preferred embodiment, the feed hopper has a generally trapezoidal shape with the top and bottom of the feed hopper lying in generally parallel horizontal planes with one another, the ends of the feed hopper tapering in a downwards direction from the top towards the bottom of the feed hopper, and the sides of the feed hopper converging towards one another in a downwards direction from the top towards the bottom of the feed hopper.

As best illustrated in FIG. 2, the top of the feed hopper preferably has a top opening into the feed hopper for permitting access into the interior of the feed hopper for service and for refilling of the feed hopper with fish feed. In this preferred embodiment, the feed hopper ideally has a lid 19 substantially closing the top opening of the top of the feed hopper.

A first of the ends 15 of the feed hopper has a bottom opening into the feed hopper adjacent the bottom of the feed hopper. Preferably, a cover 21 having has a generally rectangular box configuration and an open bottom 22 is outwardly extended from the first end of the feed hopper adjacent the bottom opening of the first end. In use, the cover is designed for help prevent precipitation from entering into the feed hopper via the bottom opening.

An elongate screw-type feed auger 23 is provided having a pair of opposite ends 24,25, a longitudinal axis extending between the ends, and an elongate central shaft 26, and a helix-shaped screw blade 27 outwardly radiating from the central shaft and extending between the ends of the feed auger. The feed auger is rotatably mounted in the feed hopper to permit free rotation of the feed auger about the longitudinal axis of the feed auger. The feed auger is positioned adjacent the bottom of the feed hopper preferably, with the feed auger extended substantially parallel to the bottom of the feed hopper and substantially perpendicular to the ends of the feed hopper.

A first of the ends 24 of the feed auger is positioned adjacent the bottom opening of the first end of the feed hopper. The feed auger is extended through a hole in a second of the ends 16 of the feed hopper such that a second of the ends 25 of the feed auger outwardly extends from the second end of the feed hopper. In use, rotation of the feed auger in a first direction advances fish feed in the feed hopper with the screw blade of the feed auger towards the bottom opening of the first end of the feed hopper such that fish feed falls out of the bottom opening of the first end of the feed hopper (as shown in FIG. 4) into the body of water therebelow.

Preferably, a generally rectangular-box-shaped housing 28 is coupled to the second end of the feed housing. The second end of the feed auger is extended into the housing. A motor 29 is mounted in the housing. The motor has a rotatable shaft 30 extending therefrom. In use, the motor rotates the shaft when activated. The motor is electrically connected to an electrical power source via a flexible electrical conduit 31 outwardly extending from the housing. Preferably, a transformer 32 is disposed in the housing and is electrically connected between the motor and the electrical power source for stepping down the electrical energy of the electrical power source (typically 120V AC or 240V AC) to the motor (preferably 12V DC).

With reference to FIG. 2, the rotatable shaft of the motor is coupled to the second end of the feed auger such that rotation of the rotatable shaft in the first direction in turn rotates the feed auger in the first direction to advance fish feed in the feed hopper towards the bottom opening. Preferably, the rotatable shaft and the second end of the feed auger are inserted into opposite ends of a flexible tubular sheath 33 to couple the rotatable shaft to the second end of the feed auger.

A switch 34 is electrically connect to the motor for selectively activating the motor to rotate the rotatable shaft. The switch is preferably mounted in the housing. The switch also has a user programmable timer 35 for measuring user determinable first and second predetermined amounts of time.

In an ideal embodiment, the housing has a plurality of downwardly depending legs 36 for supporting the housing on a ground surface. The bottom of the feed hopper also ideally has a downwardly depending leg 37 adjacent the first end of the feed hopper for supporting the feed hopper above the ground surface.

In use, the fish feeder is designed for resting on a surface adjacent a body of water such that the bottom opening of the feed hopper is positioned above the body of water so that when the feed auger is rotated in the first direction, fish feed falling out of the bottom opening falls into the body of water to feed fish in the body of water. In use, the timer sends a first signal to the switch after the timer measures the first predetermined amount of time. The switch activates the motor to rotate the rotatable shaft in the first direction upon receipt of the first signal. The timer then measures the second predetermined amount of time immediately subsequent to the first predetermined amount of time. The timer then sends a second signal to the switch after the timer measures the second predetermined amount of time. Upon receipt of the second signal, the switch deactivates the motor to stop rotation the rotatable shaft in the first direction. Finally, the timer measures the first predetermined amount of time immediately subsequent to the first second predetermined amount of time and so on.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A feeder, comprising:

a feed hopper having a bottom opening;

a feed auger being rotatably mounted in said feed hopper and having a pair of opposite ends, a first of said ends of said feed auger being positioned adjacent said bottom opening of said feed hopper;

a motor for rotating said feed auger;

wherein a rotatable shaft of said motor and a second end of said feed auger are inserted into opposite ends of a flexible tubular sheath, said sheath coupling said rotatable shaft of said motor to said second end of said feed auger such that said feed auger rotates with said rotatable shaft of said motor when said feed auger is freely rotatable and said sheath flexes to permit rotation of said motor independent of said feed auger if said feed auger bind during operation for protecting said motor from burning out; and a switch being electrically connected to said motor, said switch having a timer for controlling activation and deactivation of said motor with switch after first and second predetermined amounts of time respectively.

2. The feeder of claim 1, wherein said feed hopper has a top, a bottom, a pair of ends, and a pair of sides extending between said ends of said feed hopper, and wherein said bottom opening of said feed hopper is located in a first of said ends of said feed hopper.

3. The feeder of claim 2, wherein said feed hopper has a generally trapezoidal shape, said top and bottom of said feed hopper lying in generally parallel planes with one another, said ends of said feed hopper tapering in a downwards direction from said top towards said bottom of said feed hopper, said sides of said feed hopper converging towards one another in a downwards direction from said top towards said bottom of said feed hopper.

4. The feeder of claim 1, wherein said feed hopper has a top opening into said feed hopper.

5. The feeder of claim 1, further comprising a cover having an open bottom and being outwardly extended from said feed hopper adjacent said bottom opening.

6. A fish feeder for positioning adjacent a body of water for distributing fish feed into the body of water at predetermined time intervals, said fish feeder comprising:

a feed hopper for holding particular fish feed and having a top, a bottom, a pair of ends, and a pair of sides extending between said ends of said feed hopper;

said feed hopper having a generally trapezoidal shape, said top and bottom of said feed hopper lying in generally parallel planes with one another, said ends of said feed hopper tapering in a downwards direction from said top towards said bottom of said feed hopper, said sides of said feed hopper converging towards one another in a downwards direction from said top towards said bottom of said feed hopper;

said top of said feed hopper having a top opening into said feed hopper for permitting access into said interior of said feed hopper for service and for refilling of said feed hopper with fish feed;

said feed hopper having a lid substantially closing said top opening of said top of said feed hopper;

a first of said ends of said feed hopper having a bottom opening into said feed hopper adjacent said bottom of said feed hopper;

a cover having an open bottom being outwardly extended from said first end of said feed hopper adjacent said bottom opening of said first end, said cover being adapted for preventing precipitation from entering into said feed hopper via said bottom opening;

an elongate feed auger having a pair of opposite ends, a longitudinal axis extending between said ends, and an elongate central shaft, and a helix-shaped screw blade outwardly radiating from said central shaft and extending between said ends of said feed auger;

said feed auger being rotatably mounted in said feed hopper to permit free rotation of said feed auger about said longitudinal axis of said feed auger;

said feed auger being positioned adjacent said bottom of said feed hopper;

said feed auger being extended substantially parallel to said bottom of said feed hopper and substantially perpendicular to said ends of said feed hopper;

a first of said ends of said feed auger being positioned adjacent said bottom opening of said first end of said feed hopper;

said feed auger being extended through a second of said ends of said feed hopper such that a second of said ends of said feed auger outwardly extends from said second end of said feed hopper;

wherein rotation of said feed auger in a first direction advances fish feed in said feed hopper with said screw blade of said feed auger towards said bottom opening of said first end of said feed hopper such that fish feed falls out of said bottom opening of said first end of said feed hopper;

a housing being coupled to said second end of said feed housing;

said second end of said feed auger being extended into said housing;

a motor being mounted in said housing, said motor having a rotatable shaft extending therefrom;

said motor being electrically connected to an electrical power source via a flexible electrical conduit outwardly extending from said housing, a transformer being disposed in said housing and being electrically connected between said motor and the electrical power source for stepping down the electrical energy of the electrical power source to the motor;

said rotatable shaft of said motor being coupled to said second end of said feed auger such that rotation of said rotatable shaft in said first direction in turn rotates said feed auger in said first direction to advance fish feed in said hopper towards said bottom opening;

wherein said rotatable shaft and said second end of said feed auger are inserted into opposite ends of a flexible tubular sheath, said sheath coupling said rotatable shaft to said second end of said feed auger such that said feed auger rotates with said rotatable shaft of said motor when said feed auger is freely rotatable and said sheath flexes to permit rotation of said motor independent of said feed auger if said feed auger bind during operation for protecting said motor from burning out;

a switch being electrically connect to said motor for selectively activating said motor to rotate said rotatable shaft, said switch being mounted in said housing, said switch having a timer for measuring first and second predetermined amounts of time;

wherein said timer sending a first signal to said switch after said timer measures said first predetermined amount of time, said switch activating said motor to rotate said rotatable shaft in said first direction upon receipt of said first signal;

said timer measuring said second predetermined amount of time immediately subsequent to said first predetermined amount of time, said timer sending a second signal to said switch after said timer measures said second predetermined amount of time, said switch deactivating said motor to stop rotation said rotatable shaft in said first direction upon receipt of said second signal; and said housing having a plurality of downwardly depending legs for supporting said housing on a ground surface, said bottom of said feed hopper having a downwardly depending a downwardly depending leg adjacent said first end of said feed hopper for supporting said feed hopper above said ground surface such that said legs of said housing and said leg of said feed hopper prevent moisture from entering said feed hopper.

* * * * *